United States Patent
Ryu et al.

(10) Patent No.: US 12,479,030 B2
(45) Date of Patent: Nov. 25, 2025

(54) METHOD FOR EMBEDDING OPTICAL FIBER SENSOR IN METAL 3D PRINTING STRUCTURE, AND METAL 3D PRINTING TURBINE BLADE HAVING EMBEDDED OPTICAL FIBER SENSOR MANUFACTURED BY APPLYING EMBEDDING METHOD

(71) Applicant: Industry-Academic Cooperation Foundation, Yonsei University, Seoul (KR)

(72) Inventors: WonHyoung Ryu, Gyeonggi-do (KR); Seon iL Kim, Seoul (KR); Ho Yun Jung, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 101 days.

(21) Appl. No.: 18/261,426

(22) PCT Filed: Nov. 18, 2021

(86) PCT No.: PCT/KR2021/016983
§ 371 (c)(1),
(2) Date: Oct. 12, 2023

(87) PCT Pub. No.: WO2022/108356
PCT Pub. Date: May 27, 2022

(65) Prior Publication Data
US 2025/0001501 A1    Jan. 2, 2025

(30) Foreign Application Priority Data

Nov. 20, 2020 (KR) .................. 10-2020-0156509
Nov. 17, 2021 (KR) .................. 10-2021-0158209

(51) Int. Cl.
*B22F 10/50* (2021.01)
*B22F 10/22* (2021.01)
(Continued)

(52) U.S. Cl.
CPC .............. *B22F 10/50* (2021.01); *B22F 10/22* (2021.01); *F01D 21/003* (2013.01); *B33Y 40/00* (2014.12); *B33Y 80/00* (2014.12)

(58) Field of Classification Search
CPC .......... B22F 10/50; B22F 10/22; B33Y 40/00; B33Y 80/00; F01D 21/00; F01D 21/003
See application file for complete search history.

(56) References Cited

U.S. PATENT DOCUMENTS 4,407,561 A * 10/1983 Wysocki .............. G02B 6/4402
385/128
7,432,505 B2   10/2008 Brummel
(Continued)

FOREIGN PATENT DOCUMENTS

| CN | 212255806 U | 12/2020 |
| EP | 3338919 B1 | 6/2021 |
| KR | 20190103531 A | 9/2019 |

OTHER PUBLICATIONS

English Translation of International Search Report and Written Opinion of PCT/KR2021/016983, mailed Feb. 21, 2022.
(Continued)

*Primary Examiner* — Nathaniel E Wiehe
*Assistant Examiner* — Joshua R Beebe
(74) *Attorney, Agent, or Firm* — DICKINSON WRIGHT PLLC

(57) ABSTRACT

An object of the present invention is to provide an optical fiber sensor embedding method for a three-dimensional (3D) metal printing structure capable of embedding an optical fiber sensor without any damage by regulating 3D printing
(Continued)

dwell time at a location where an optical fiber sensor is embedded while embedding an optical fiber sensor for sensing temperature, stress, etc., in a high-temperature harsh environment close to a melting point of metal when manufacturing a 3D metal printing structure. Another object of the present invention provides an optical fiber sensor embedded 3D metal printing turbine blade manufactured by applying the embedding method so that the turbine blade, which is a complex and precise product, is manufactured using 3D metal printing but the optical fiber sensor is embedded using the above-described optical fiber sensor embedding method.

10 Claims, 7 Drawing Sheets

(51) Int. Cl.
  *F01D 21/00* (2006.01)
  *B33Y 40/00* (2020.01)
  *B33Y 80/00* (2015.01)

(56) References Cited

U.S. PATENT DOCUMENTS

| | | | |
|---|---|---|---|
| 8,565,999 | B2 | 10/2013 | Bunce et al. |
| 2007/0258807 | A1 | 11/2007 | Brummel |
| 2012/0150413 | A1 | 6/2012 | Bunce et al. |
| 2017/0304946 | A1* | 10/2017 | Shibazaki ............ B23K 26/342 |
| 2018/0250775 | A1* | 9/2018 | Spink .................... B23K 26/10 |
| 2020/0094472 | A1* | 3/2020 | Brown ................... B22F 10/28 |
| 2021/0230076 | A1 | 7/2021 | Petrie et al. |

OTHER PUBLICATIONS

English Translation of International Preliminary Report On Patentability (IPRP) of PCTKR2021/016983, mailed May 16, 2023.

Petrat, Torsten, et al., "Embedding electronics into additive manufactured components using laser metal deposition and selective laser melting". 10th CIRP Conference on Photonic Technologies Sep. 3, 2018, vol. 74, pp. 168-171.

Jung, I. D., et al., "Embedding Sensors using Selective Laser Melting for Self-Cognitive Metal Parts", Additive Manufacturing (2020), vol. 33; pp. 1-27; DOI: https://doi.org/10.1016/j.addma.2020.101151.

Kim, S. I., et al., "Development of Part-embedded High Temperature Sensor by 3D Printing", Nov. 26, 2020; Winter Conference of the Korean Society for Fluid Machinery (KSFM); pp. 1-23.

Kim, S. I., et al., "High Temperature Measurements with Embedded Ni Jacketed Fiber Bragg Grating Sensor", May 27, 2021, poster. Non-official translation. Conference of the Korean Society of Mechanical Engineers (KSME).

Kim, S. I., et al., "Optimal Conditions for 3D Printing of Ni Jacketed Fiber Bragg Grating Sensor for High Temperature Measurement"; Dec. 17, 2020, poster. Non-official translation. 2020 Conference of the Korean Society of Mechanical Engineers.

Kim, S. I., et al., "Miniature-Turbine Blade Embedded Fiber Bragg Grating Sensors for High Temperature Measurements" (2021 Conference of the Korean Society of Mechanical Engineers) Nov. 5, 2021; pp. 1-17.

Havermann, D., et al., Measuring Residual Stresses in Metallic Components Manufactured with Fibre Bragg Gratings embedded by Selective Laser Melting. 24th International Conference on Optical Fibre Sensors (OFS24). Sep. 28, 2015, vol. 9634, pp. 1-4; DOI: 10.1117/12.2194352.

Boccard, J.-M., et al., "High-Resolution, Far-Field, and Passive Temperature Sensing up to 700° C. Using an Isolated ZST Microwave Dielectric Resonator," in IEEE Sensors Journal, vol. X; No. X, Month 2015; DOI: 10.1109/JSEN.2015.2487606.

Jung, I. D., et al., "Embedding sensors using selective laser melting for self-cognitive metal parts", Additive Manufacturing 33 (2020) 101151; pp. 1-9; DOI: https://doi.org/10.1016/j.addma.2020.101151.

Havermann, D., et al., "Temperature and Strain Measurements with Fiber Bragg Gratings Embedded in Stainless Steel 316" Journal of Lightwave Technology; DP 2015; vol. 33; No. 12, 6945802; pp. 2474-2479; https://doi.org/10.1109JLT.2014.2366835.

* cited by examiner

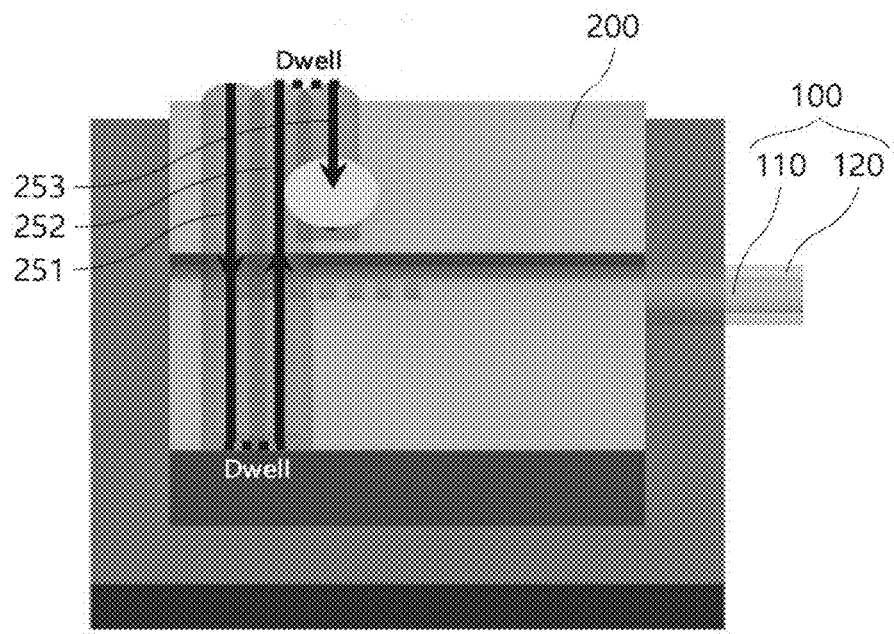
FIG. 4
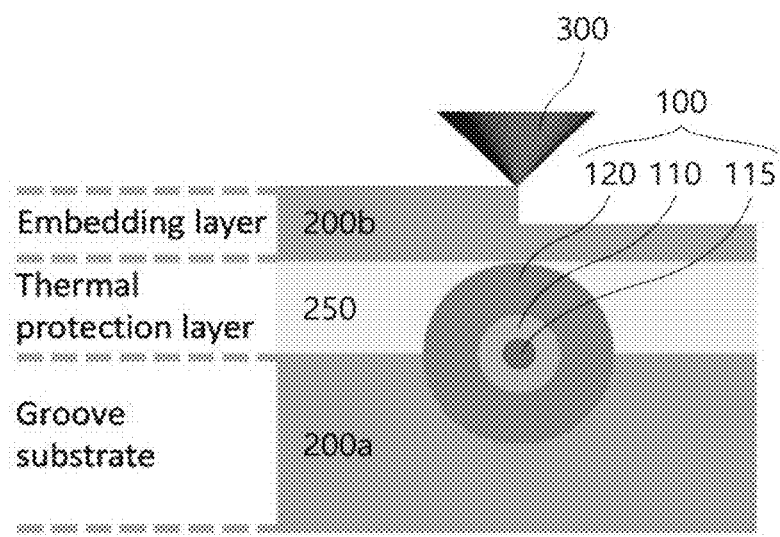

METHOD FOR EMBEDDING OPTICAL FIBER SENSOR IN METAL 3D PRINTING STRUCTURE, AND METAL 3D PRINTING TURBINE BLADE HAVING EMBEDDED OPTICAL FIBER SENSOR MANUFACTURED BY APPLYING EMBEDDING METHOD

CROSS-REFERENCE TO RELATED APPLICATIONS

This application claims priority under 35 U.S.C. § 119 to Korean Patent Application No. 10-2020-0156509, filed on Nov. 20, 2020, and Korean Patent Application No. 10-2021-0158209, filed on Nov. 17, 2021, in the Korean Intellectual Property Office, the disclosure of which is incorporated herein by reference in its entirety.

TECHNICAL FIELD

The following disclosure relates to an optical fiber sensor embedding method for a 3D metal printing structure, and more particularly, to an optical fiber sensor embedding method capable of embedding an optical fiber sensor for sensing temperature, stress, etc., without any damage in a high-temperature harsh environment close to a melting point of metal when manufacturing a 3D metal printing structure. In addition, the following disclosure relates to an optical fiber sensor embedded 3D metal printing turbine blade manufactured by applying the embedding method so that the turbine blade, which is a complex and precise product, is manufactured using 3D metal printing but the optical fiber sensor is embedded using the above-described optical fiber sensor embedding method.

BACKGROUND

A turbine blade is a part that is used in various standards and shapes in very various fields, from automobiles to power plants. In general, the turbine blades rotate at very high speed and often operate in harsh environments such as high temperature and high pressure. Therefore, many efforts are being made to evaluate and monitor structural health of turbine blades with high reliability.

Structural health monitoring (SHM) is a technology that analyzes, diagnoses, and evaluates a state of a structure. Since the SHM has the advantage of being able to identify micro-defects that cause damages to large structures or parts with a non-destructive testing method, many researches are being conducted on the development of sensors related thereto.

Boccard, Jean-Michel et al. IEEE Sensors Journal 16.3 (2016): 715. (Non-Patent Document 1) is a study on wireless passive temperature measurement using a dielectric resonator made of zirconium tin titanate (ZST, Zr0.8Sn0.2TiO4) ceramic, in which remote sensing was performed at a long distance (1.2 M) with high resolution (high quality factor) using a microwave dielectric resonator, and performance evaluation was also conducted at a maximum operating temperature of 700° C. However, the above study showed that the high Q factor at initial room temperature is lowered by the high temperature, which means that sensitivity of the sensor decreases as the temperature rises. In addition, there is a disadvantage that a price is high, and there is a possibility of being affected by radio wave interference due to characteristics of microwaves.

In Jung, Im Doo, et al. Additive Manufacturing 33 (2020): 101151. (Non-Patent Document 2), an IC sensor is embedded in two metal components of SS 316L and Inconel 718C using the SLM method, but in order to protect the IC sensor from thermal damage caused by laser melting during embedding, a metal protective layer was applied and the damage was analyzed according to the thickness. In this study, the temperature measurement of the IC-embedded metal part and the Bare IC sensor were compared, and it was shown that remote sensing using Bluetooth and WiFi is possible. That is, in summary, the above study describes a technology for embedding an IC sensor using 3D metal printing of the SLM method and measuring remote temperature using Bluetooth and WiFi for heating conditions near room temperature. However, the above study has a limitation in that it is impossible to operate in a high-temperature environment due to the characteristics of a semiconductor circuit board.

US20070258807A1 (Patent Document 1) discloses a thermal imaging sensor for detecting crack generation due to deterioration in rotating steam turbine blades during operation. In the above invention, a thermal image is measured using two infrared sensors, and each sensor detects an infrared bandwidth avoiding a water vapor absorption band. As a result, it was possible to remotely monitor radiant heat energy emitted from the turbine blades online. In the case of the above invention, there is a disadvantage that the measurement distance of the infrared sensor is short and is affected by the surrounding environment.

U.S. Pat. No. 8,565,999B2 (Patent Document 2) discloses a technique for measuring the temperature of gas and blade wall surfaces around the turbine to control the operation of the gas turbine engine. In the above invention, the temperature is measured by a method of receiving an acoustic signal transmitted from an acoustic transmitter installed in a wake region of a turbine blade through several receivers located on a shaft by using an acoustic pyrometer system. In summary, the above invention is a technology for measuring a temperature of a turbine blade and controlling an operation of the turbine blade using an acoustic pyrometer method. In the case of using the acoustic method, reliability deteriorates due to loss caused by refraction, and correction is possible by installing multiple receivers. However, this makes the unit cost of the sensor expensive.

Havermann, Dirk, et al. Journal of Lightwave Technology 33.12 (2015): 2474-2479. (Non-Patent Document 3) is a study on embedding Ni electroplated FBG sensors to improve bonding between optical fibers and metal parts and to serve as a thermal buffer, and analyzed a thickness of Ni electroplating suitable for conditions in which metal parts are embedded and heated and cooled, and analyzed the temperature and tensile measurement under the heating and cooling conditions using a metal part embedded type FBG sensor. However, the existing SLM method has limitations of difficulty in large area and slow process speed, and therefore, is difficult to apply to manufacture of large parts such as a turbine blade.

RELATED ART DOCUMENT

Patent Document

1. US20070258807A1
2. U.S. Pat. No. 8,565,999B2

Non-Patent Document

1. Boccard, Jean-Michel et al. IEEE Sensors Journal 16.3 (2016):715.

2. Jung, Im Doo, et al. Additive Manufacturing 33 (2020): 101151.
3. Havermann, Dirk, et al. Journal of Lightwave Technology 33.12 (2015): 2474-2479.

SUMMARY

Object of the Invention

An embodiment of the present invention is directed to providing an optical fiber sensor embedding method for a three-dimensional (3D) metal printing structure capable of embedding an optical fiber sensor without any damage by regulating 3D printing dwell time at an optical fiber sensor embedded location while embedding an optical fiber sensor to sense temperature, stress, etc., in a high-temperature harsh environment close to a melting point of metal when manufacturing a 3D metal printing structure. Another object of the present invention provides an optical fiber sensor embedded 3D metal printing turbine blade manufactured by applying the embedding method so that the turbine blade, which is a complex and precise product, is manufactured using 3D metal printing but the optical fiber sensor is embedded using the above-described optical fiber sensor embedding method.

Solution of the Invention

In one general aspect, an optical fiber sensor embedding method for a 3D metal printing structure includes: an optical fiber sensor arranging step in which the optical fiber sensor 100 is arranged at a predetermined location during manufacturing of a structure 200 while the structure 200 is manufactured by 3D metal printing; and a thermal protective layer forming step in which a thermal protective layer 250 is manufactured as a layer sequentially formed according to a predetermined order in a form in which a plurality of deposited lines 210 made of molten metal cover the optical fiber sensor 100 and a predetermined dwell time is given between formation operations of each of the deposited lines 210.

The dwell time may be formed within a range in which heat dissipation of the deposited line 210 occurs to a level that prevents the optical fiber sensor 100 from being damaged by thermal shock generated from the molten metal.

During the formation of the deposited line 210, the deposited line 210 may be formed in a form in which a dilution layer 211 having the molten metal less hardened and a deposited layer 212 formed on an outside of the dilution layer 211 to dissipate heat to outside air and having the molten metal completely hardened are stacked, and the dwell time may be determined within a range of time required for the dilution layer 211 of one deposited line 210 to be converted into the deposited layer 212 by 50% to 100%.

The optical fiber sensor embedding method may further include: prior to the optical fiber sensor arranging step, a pre-embedding step in which a product 200a before embedding having a shape of the structure 200 before the optical fiber sensor 100 is embedded is manufactured by repeating a 3D printing step in which layers formed by arranging the plurality of deposited lines 210 in a predetermined shape are stacked; and after the thermal protective layer forming step, a post-embedding step in which a product after embedding 200b having the shape of the remaining structure 200 after the product before embedding 200a is manufactured by repeating the 3D printing step after the optical fiber sensor 100 is embedded.

In the pre-embedding step, an accommodation groove 220 in which the optical fiber sensor 100 is accommodated may be formed at a location where the optical fiber sensor 100 is arranged.

The optical fiber sensor embedding method may be performed by a direct metal deposition (DED) method in which, when the deposited line 210 is formed, a step of injecting a metal powder injecting body 315 toward a predetermined target location with a metal powder nozzle unit 310 of a printing head 300, a step of forming a molten part 325 by melting the metal powder injecting body 315 by a laser beam 320 irradiated from the printing head 300 to the target location, and a step of forming the deposited line 210 by moving the printing head 300 to another location along a predetermined trajectory and curing the molten part 325 by heat dissipation from the outside over time are repeated.

In the thermal protective layer forming step, the plurality of deposited lines 210 may be sequentially formed from one end to the other end of the optical fiber sensor 100.

The thermal protective layer forming step may include, when the deposited lines 210 forming the thermal protective layer 250 are referred to as an n-th thermal protective layer deposited line in order, and a total number of deposited lines 210 is N, a step of forming a first thermal protective layer deposited line 251 at one end of the optical fiber sensor 100, a step of forming a second thermal protective layer deposited line 252 closely to or at a predetermined interval from the other side of the first thermal protective layer deposited line 251, . . . , a step of forming the n-th thermal protective layer deposited line closely to or at a predetermined interval from the other side of an n–1-th thermal protective layer deposited line, . . . , and a step of forming an N-th thermal protective layer deposited line at the other end of the optical fiber sensor 100 closely to or at a predetermined interval from the other side of an N–1-th thermal protective layer deposited line.

In the thermal protective layer forming step, the plurality of deposited lines 210 may be sequentially formed from both ends to central portion of the optical fiber sensor 100.

The thermal protective layer forming step may include, when the deposited lines 210 forming the thermal protective layer 250 is referred to as a ⓝ-th thermal protective layer deposited line in order, and a total number of deposited lines 210 is m, a step of forming a ①-th deposited line at one end of the optical fiber sensor 100, a step of forming a ②-th deposited line at the other end of the optical fiber sensor 100, a step of forming a ③-th deposited line closely to the other side of the ①-th deposited line or at a predetermined interval, a step of forming a ④-th deposited line closely to one side of the ②-th deposited line or at a predetermined interval, . . . , and a step of forming a ⓜ-th deposited line at a central portion of the optical fiber sensor 100.

In another general aspect, an optical fiber sensor embedded 3D metal printing turbine blade may be manufactured by the 3D metal printing method including the optical fiber sensor embedding method for a 3D metal printing structure as described above, and at least one optical fiber sensor 100 may be embedded in a predetermined location inside.

The optical fiber sensor 100 may include an optical fiber 110 in which a Bragg grating 115 is formed.

The optical fiber sensor 100 may include a metal jacket 120 surrounding the optical fiber 110.

The metal jacket 120 may be made of the same metal as metal constituting the structure 200.

Effect of the Invention

According to the present invention, it is possible to embed an optical fiber sensor without any damage by regulating 3D printing dwell time at an optical fiber sensor embedded location while embedding an optical fiber sensor for sensing temperature, stress, etc., in a high-temperature harsh environment close to a melting point of metal when manufacturing a 3D metal printing structure. Specifically, according to the present invention, heat is sufficiently dissipated to minimize heat accumulation by lengthening a dwell time during printing at the optical fiber sensor embedded location in the 3D metal printing process. Accordingly, it is possible to prevent damage to the optical fiber sensor due to high-temperature thermal shock.

In addition, according to the present invention, by optimizing an embedding direction when embedding the optical fiber sensor, it is possible to make the optical fiber sensor well fixed on an embedded surface and prevent the optical fiber sensor from being stretched due to thermal deformation.

In addition, according to the present invention, as described above, since the optical fiber sensor may be embedded in a metal product without any damage even in the high-temperature harsh environment, it is possible to embed the optical fiber sensor while manufacturing a turbine blade, which is a product of a complex and precise shape, using the 3D metal printing. Since the optical fiber sensor is completely embedded in the turbine blade, it is possible to more accurately measure various physical quantities such as temperature and stress during operation and obtain much better structural health monitoring results.

BRIEF DESCRIPTION OF THE DRAWINGS

FIG. 4 is a diagram illustrating a first embodiment of an optical fiber sensor embedding direction of the 3D metal printing structure of the present invention.

DETAILED DESCRIPTION OF MAIN ELEMENTS

Figure 1:
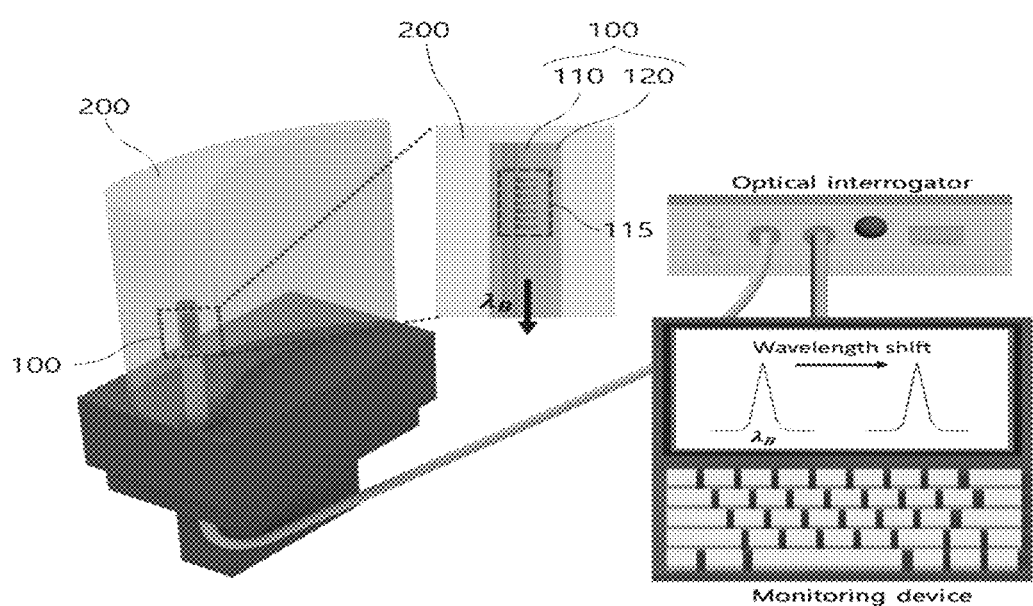
FIG. 1 is a conceptual diagram of sensing in a structure in which an optical fiber sensor is embedded.

100: Optical fiber sensor
110: Optical fiber
115: Bragg grating 120: Metal jacket
200: Structure
200a: Product before embedding
200b: Product after embedding
210: deposited line
211: Dilution layer 212: Deposited layer
220: Accommodation groove
250: Thermal protective layer
251: First thermal protective layer deposited line
252: Second thermal protective layer deposited line
253: Third thermal protective layer deposited line
300: Printing head
310: Metal powder nozzle part
315: Metal powder injecting body
320: Laser beam 325: Molten part

DETAILED DESCRIPTION OF EMBODIMENTS

Hereinafter, an optical fiber sensor embedding method for a 3D metal printing structure according to the present invention having the above configuration and an optical fiber sensor embedded 3D metal printing turbine blade manufactured by applying the embedding method will be described in detail with reference to the accompanying drawings.

FIG. 1 is a conceptual diagram of sensing in a structure in which an optical fiber sensor is embedded. As illustrated, at least one optical fiber sensor 100 is embedded in a predetermined location inside a structure 200 manufactured by 3D metal printing. The optical fiber sensor 100 may include an optical fiber 110 having a Bragg grating 115 formed therein, and in addition to this, metal jacket 120 surrounding the optical fiber 110 to prevent thermal shock (which will be described in more detail later). In this case, the metal jacket 120 may be made of the same metal as metal constituting the structure 200. The structure 200 may be, in particular, a turbine blade having a complex and sophisticated shape, as described above.

When an optical signal is transmitted to the optical fiber sensor 100, a response signal may be generated by the Bragg grating 115 and received by the monitoring device. In this case, signal characteristics such as a wavelength and phase of the response signal are determined by the spacing of the Bragg gratings 115, and the spacing of the Bragg gratings 115 is a value known in advance at the time of manufacturing. Therefore, it may be inferred that the signal characteristics of the response signal will not change when deformation does not occur in the optical fiber sensor 100. Meanwhile, when the temperature environment of the structure 200 in which the optical fiber sensor 100 is embedded changes or the deformation occurs due to an external force, the optical fiber sensor 100 also deforms, and as a result, the spacing of the Bragg grating 115 changes. When the spacing of the Bragg grating 115 changes, the change in signal characteristics such as the phase change occurs, and it is possible to calculate how much deformation has occurred through the amount of change. That is, the deformation of the structure 200 may be identified using the response signal of the optical fiber sensor 100, so the structural safety of the structure 200 may be monitored.

For such structure health monitoring, it is important that the optical fiber sensor 100 stably embedded in the structure 200 operates correctly. However, as described above, when the structure 200 is made of a metal material, there is a risk that the optical fiber sensor 100 may be damaged due to thermal shock caused by a very high melting point during the manufacturing process. As a result, there was a difficult problem in manufacturing the structure 200 in which the optical fiber sensor 100 is embedded by the 3D metal printing.

In the present invention, when the optical fiber sensor 100 is arranged while the structure 200 is manufactured by 3D metal printing, printing is performed in a different way from other parts, so the thermal protective layer 250 to protect the optical fiber sensor 100 from thermal shock is formed at the location where the optical fiber sensor 100 is embedded. In this way, the optical fiber sensor 100, which operates normally without being damaged, may be stably and smoothly embedded in the structure 200. Hereinafter, the optical fiber sensor embedding method for a 3D metal printing structure of the present invention will be described in detail.

Figure 2:
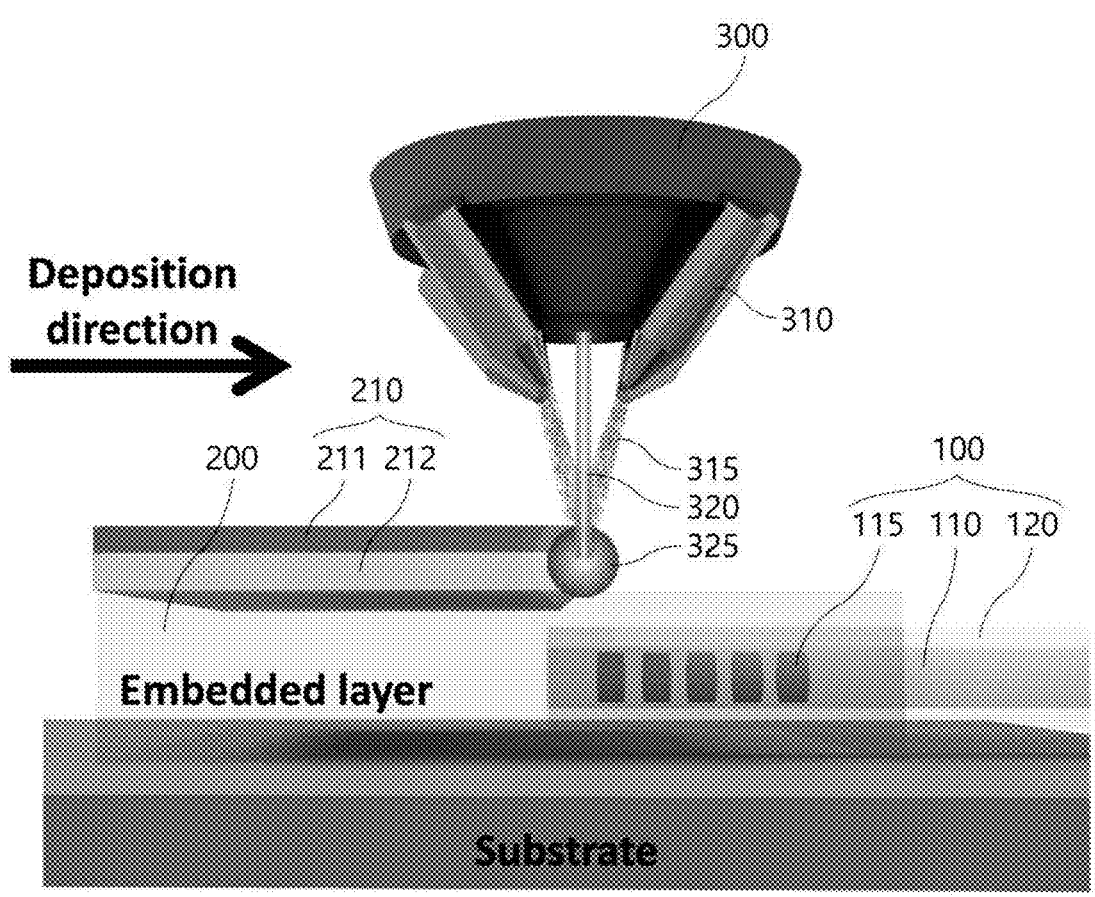
FIG. 2 is a conceptual diagram of a process of embedding an optical fiber sensor in a 3D metal printing process.

FIG. 2 is a conceptual diagram of a process of embedding an optical fiber sensor in a 3D metal printing process. The method illustrated in FIG. 2 corresponds to a 3D metal printing method known as a direct metal deposition (DED) method. While the structure 200 is manufactured by the 3D metal printing, a deposited line 210 is made by molten metal. More specifically, as illustrated in FIG. 2, a metal powder injecting body 315 is injected toward a predetermined target location through the metal powder nozzle unit 310 of the printing head 300, and the metal powder injecting body 315 is melted by the laser beam 320 irradiated from the printing head 300 to the target position to form the molten part 325. When the printing head 200 moves to another location along a predetermined trajectory, the molten part 325 is hardened by heat dissipation from the outside over time to form the deposited line 210.

The DED method is the most advanced method among the current 3D printing methods, and is much free from material limitations as it is manufactured in a higher temperature environment than the conventional selective laser melting (SLM), ultrasonic additive manufacturing (UAM) methods, and the like. As a result, the DED method is the most preferred method for the 3D metal printing. However, the DED method has a high process temperature of 1700 to 1800° C. (SLM: ~1500° C., UAM: 600 to 800° C.), and a relatively large total melt area, so the amount of heat energy applied to an object during the work process is relatively high. That is, when the optical fiber sensor 100 is to be embedded while the structure 200 is manufactured by the DED method, it is difficult to stably exclude the risk of damage due to thermal shock only by covering the optical fiber sensor 100 with the metal jacket 120.

Meanwhile, as well illustrated in FIG. 2, during the formation of the deposited line 210, the deposited line 210 is formed in the form in which a dilution layer 211 having the molten metal less hardened and a deposited layer 212 formed on an outside of the dilution layer 211 to dissipate heat to outside air and having the molten metal completely hardened are stacked. To explain in an easy-to-understand way, the temperature of the molten part 325 is very high compared to the external environment, so heat is quickly transferred to the external environment. Therefore, the molten part 325 is cooled from the outside, and therefore, the dilution layer 211, which is still less cooled (i.e., the molten metal is less hardened), is formed on the inside, and the deposited layer 212, which is completely cooled (i.e., the hardening of the molten metal is completed), is formed on the outside. Of course, the heat of the dilution layer 211 is also completely dissipated to the external environment over time (i.e., the heat of the dilution layer 211 cools down), so the molten metal is completely hardened. That is, finally, the dilution layer 211 is completely converted into the deposited layer 212, and thus, the formation of the deposited line 210 is completed.

Looking at this 3D metal printing process, it can be seen that the highest temperature environment is formed in the state of the molten part 325. In this case, when the optical fiber sensor 100 repeatedly comes into contact with the plurality of molten parts 325 for a short time interval, the optical fiber sensor 100 receives excessive heat and is damaged. In the present invention, taking this point into consideration, the printing is performed in a different way from other times only when the optical fiber sensor 100 is embedded while the structure 200 is manufactured by the 3D metal printing.

Specifically, the optical fiber sensor embedding method for a 3D metal printing structure of the present invention includes an optical fiber sensor arranging step and a thermal protective layer forming step. FIGS. 3A to 3C are flowcharts of an optical fiber sensor embedding method for a 3D metal printing structure of the present invention. First of all, prior to the optical fiber sensor arranging step, a pre-embedding step in which a product 200a before embedding having the shape of the structure 200 before the optical fiber sensor 100 is embedded is manufactured by repeating a 3D printing step in which layers formed by arranging the plurality of deposited lines 210 in a predetermined shape are stacked is performed in advance. In addition, after the thermal protective layer forming step, a post-embedding step in which a product after embedding 200b having the shape of the remaining structure 200 after the product before embedding 200a by repeating the 3D printing step after the optical fiber sensor 100 is embedded is manufactured is performed, so the manufacturing of the structure 200 is completed.

Figure 3:
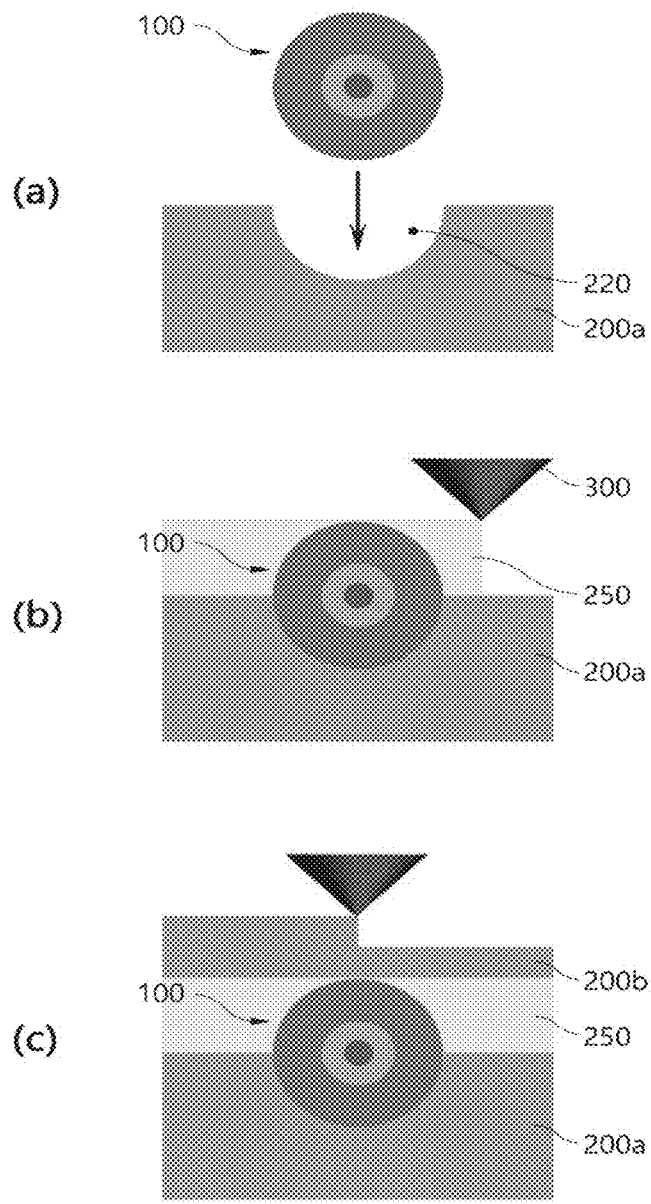
FIG. 3 shows an optical fiber sensor embedding method for a 3D metal printing structure of the present invention step by step.

The optical fiber sensor arranging step is illustrated in (a) of FIG. 3. In the optical fiber sensor arranging step, the optical fiber sensor 100 is arranged at a predetermined location during the manufacturing of the structure 200. As illustrated in (a) of FIG. 3, when the optical fiber sensor 100 is simply arranged at a desired location in the state where the product before embedding 200a has been formed by performing the pre-embedding step in advance, it may be said that the optical fiber sensor arranging step is completed. In this case, in order for the optical fiber sensor 100 to be stably fixed in place without changing its location during the embedding process, as explicitly illustrated in (a) of FIG. 3, it is preferable to form an accommodation groove 220 in which the optical fiber sensor 100 is accommodated at a location where the optical fiber sensor 100 is disposed in the pre-embedding step.

The thermal protective layer forming step is illustrated in (b) of FIG. 3. In the thermal protective layer forming step, the thermal protective layer 250 is made as a layer formed sequentially according to a predetermined order in the form in which the plurality of deposited lines 210 made of molten metal cover the optical fiber sensor 100. This way is no different from general 3D metal printing, but in the present invention, when forming the thermal protective layer 250, a predetermined dwell time is given between the operations of forming each of the deposited lines 210.

The technical meaning of the dwell time is physically solved and explained as follows. As described above, in the process of embedding the optical fiber sensor 100, (refer to FIG. 2), the highest temperature molten part 325 in the molten metal state repeatedly contact the optical fiber sensor 100. Then, no matter how much the optical fiber sensor 100 is thermally protected by the metal jacket 120 or the like, there is a risk of damage due to accumulation of heat. However, in the present invention, after an event in which the molten part 325 contacts the optical fiber sensor 100 while making one deposited line 210, until the next deposited line 210 is made, the operation stops and waits for the dwell time. During the dwell time, the heat of the molten part 325 is naturally dissipated to the external environment. By giving the dwell time in this way, the heat cools down appropriately, and excessive heat accumulation does not occur in the optical fiber sensor 100 even if the next deposited line 210 is made on the optical fiber sensor 100. That is, by giving the dwell time, it is possible to very effectively prevent the optical fiber sensor 100 from being damaged by thermal shock while embedding the optical fiber sensor 100.

Here, the dwell time is formed within a range in which the heat dissipation of the deposited line 210 occurs to a level that prevents the optical fiber sensor 100 from being damaged by the thermal shock generated from the molten metal. That is, to put it simply, the optical fiber sensor 100 may be sufficiently cooled so as not to be damaged by the thermal shock. Most safely, the time required for the dilution layer 211 of one deposited line 210 to be converted by 100% to the deposited layer 212 may be determined as the dwell time. However, in this case, there is a risk that the time required for the embedding process of the optical fiber sensor 100 excessively increases. When the dwell time is determined to such an extent that the dilution layer 211 is converted into the deposited layer 212 by about 50%, the thermal shock may be prevented to some extent and the manufacturing time may be reduced. That is, by appropriately considering both the effect of preventing the thermal shock and the effect of reducing the manufacturing time, the dwell time is preferably determined within a range of time required for the dilution layer 211 of one deposited line 210 to be converted by 50% to 100% into the deposited layer 212.

The 3D metal printing process after the optical fiber sensor embedment is completed, that is, the post-embedding step described above is performed, is shown in (c) of FIG. 3. When the embedding of the optical fiber sensor is completed through the processes of (a) and (b) of FIG. 3 and the process of (c) of FIG. 3 is completed, the manufacturing of the structure 200 is completed. When the processes of (a) to (c) of FIG. 3 are sequentially performed, the process of embedding one optical fiber sensor 100 in the structure 200 is completed. Of course, the plurality of optical fiber sensors 100 may be embedded in the structure 200 in a vertical direction. In such a case, the processes of FIGS. 3A and 3B may be further repeated at a desired location.

As described above, according to the optical fiber sensor embedding method for a 3D metal printing structure of the present invention, in the process of forming a plurality of deposited lines, before one deposited line cools down completely, in order to prevent the excessive heat accumulation in the optical fiber sensor in the process of making the next deposited line, after one deposited line cools down appropriately, an appropriate dwell time is given between the operations of forming the deposited lines so that the next deposited line may be made. In addition to this, in order to ensure that the optical fiber sensor 100 is appropriately embedded in a desired location, the order of forming the deposited line may be further considered.

FIG. 4 is a diagram illustrating a first embodiment of an optical fiber sensor embedding direction of the 3D metal printing structure of the present invention. In the first embodiment, the plurality of deposited lines 210 are sequentially formed from one end to the other end of the optical fiber sensor 100, similar to a method mostly applied in a general 3D metal printing process. Specifically, when the deposited lines 210 forming the thermal protective layer 250 are referred to as an n-th thermal protective layer deposited line in order, and a total number of deposited lines 210 is N, the thermal protective layer forming step includes a step of forming a first thermal protective layer deposited line 251 at one end of the optical fiber sensor 100, a step of forming a second thermal protective layer deposited line 252 closely to or at a predetermined interval from the other side of the first thermal protective layer deposited line 251, a step of forming the n-th thermal protective layer deposited line closely to or at a predetermined interval from the other side of an n−1-th thermal protective layer deposited line, . . . , and a step of forming an N-th thermal protective layer deposited line at the other end of the optical fiber sensor 100 closely to or at a predetermined interval from the other side of an N−1-th thermal protective layer deposited line. Here, " . . . " is a part that omits the description of the next step that proceeds continuously.

Additionally describing, an example in which each deposited line is formed to be close to each other is illustrated on the drawing, and this corresponds to "[closely to the other side] ~deposited line is formed" in the description of each step described above. Meanwhile, in order to achieve better heat dissipation, the thermal protective layer 250 may have a coarser structure than other portions. In this case, the deposited lines may be formed to be spaced apart from each other by a predetermined interval, which corresponds to "formation of ~deposited lines [at a predetermined interval]" in the description of each step described above.

In the case of applying the same embedding direction as in the first embodiment, when writing an operation algorithm in the 3D metal printing device, the basic operation algorithm is followed as it is, but only the dwell time is changed and assigned. Therefore, the embedding direction of the first embodiment has the advantage of making it easy to write the operation algorithm. However, as described above, the 3D metal printing operation is an operation in which a very high temperature environment is formed locally and momentarily, and it is necessary to consider that slight thermal deformation occurs at the location where the high temperature environment is formed. That is, in the case of embedding from one side to the other side as in the first embodiment, the optical fiber sensor 100 is slightly stretched by the thermal deformation, and thus, there is a risk that the embedding is made in the last step, that is, at the other end position, at a position that is more elongated than the original position. In addition, in the process of embedding the optical fiber sensor 100, the optical fiber sensor 100 may be twisted due to the thermal deformation, and in such a case, the dislocation at the other end also occurs more significantly.

Figure 5:
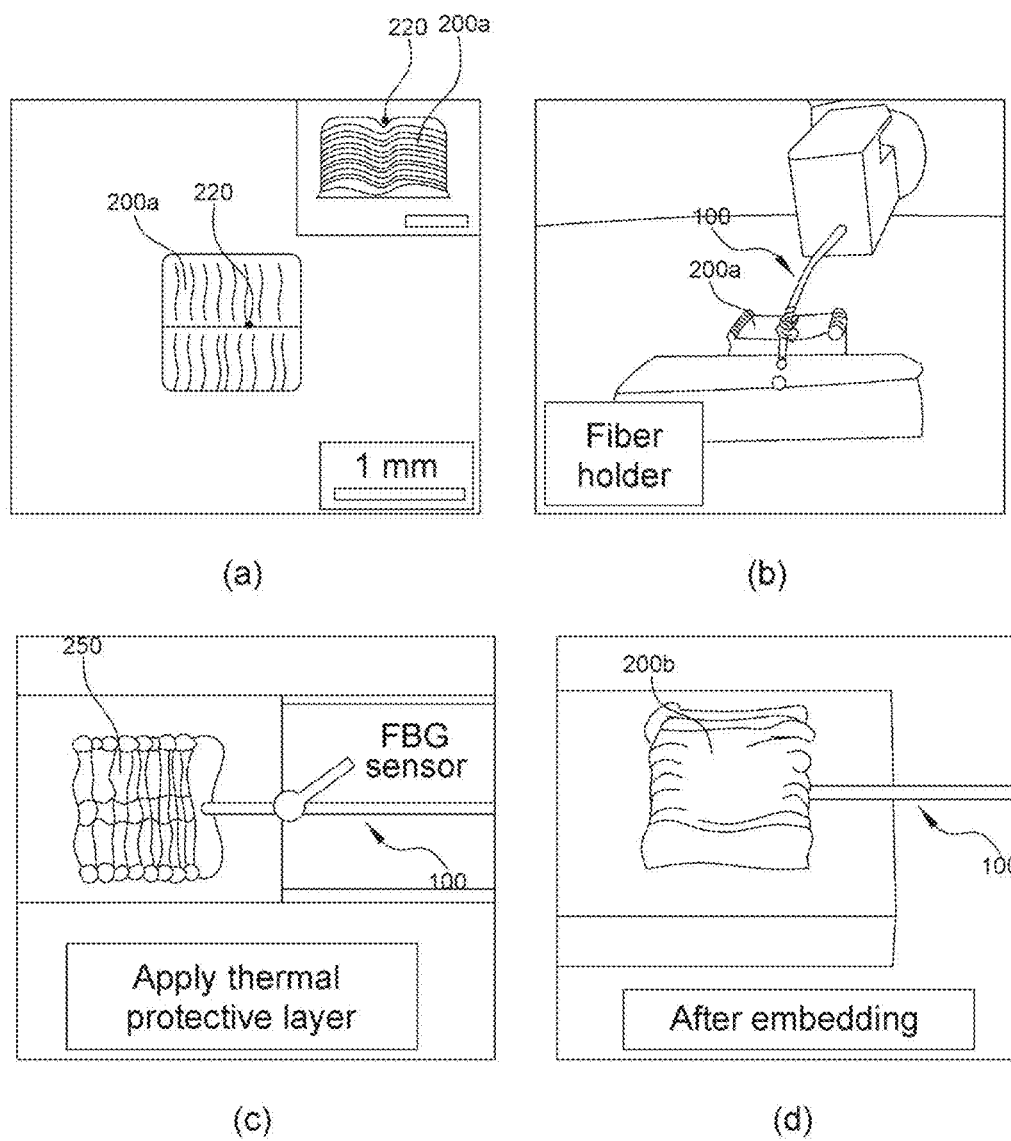
FIG. 5 is a diagram progressively illustrating an embodiment of a thermal protective layer manufactured by the optical fiber sensor embedding method for a 3D metal printing structure of the present invention.

FIG. 5 illustrates a list of pictures of actual thermal protective layers manufactured by the optical fiber sensor embedding method for a 3D metal printing structure of the present invention. In FIG. 5, (a) is a photograph of the product before embedding 200a in which the accommodation groove 220 is formed by the pre-embedding step, (b) is a photograph of the optical fiber sensor arranging step, which is manufactured at a laboratory level and therefore, illustrates a state in which a holder is additionally arranged so that the optical fiber sensor 100 is not dislocated undesirably during manufacturing, (c) is a photograph after the thermal protective layer forming step is completed, and (d) is a photograph of a state in which the 3D metal printing is additionally performed on the thermal protective layer 250 to form the product after embedding 200b.

Figure 6:
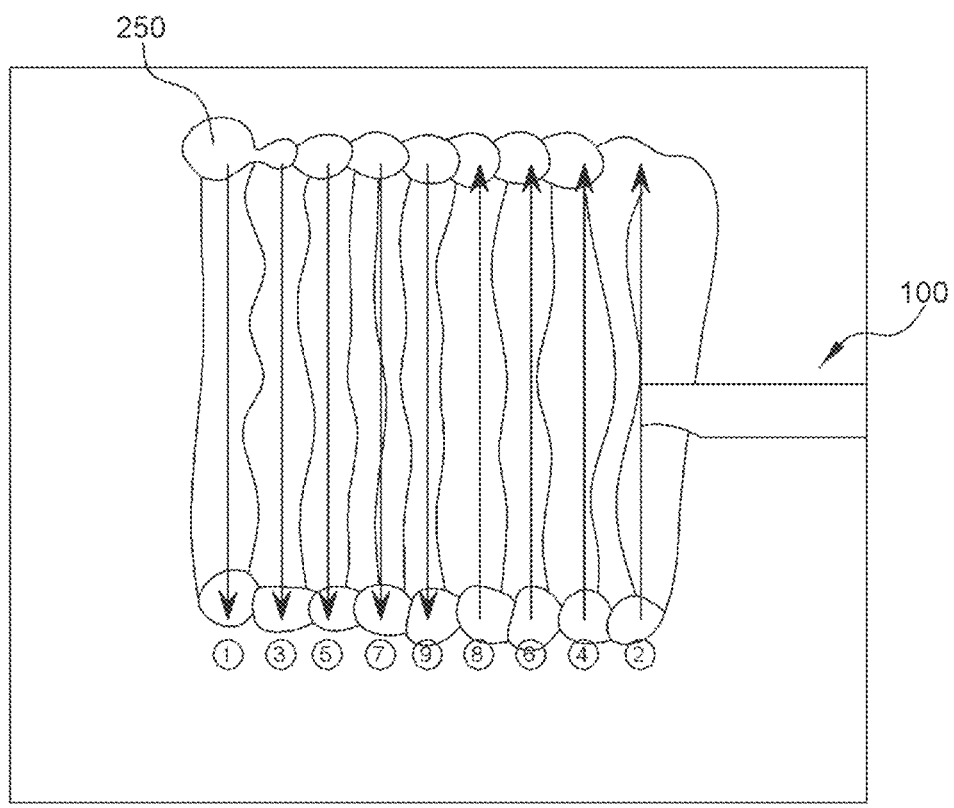
FIG. 6 is a diagram illustrating a second embodiment of the optical fiber sensor embedding direction of the 3D metal printing structure of the present invention.

FIG. 6 shows a second embodiment of the optical fiber sensor embedding direction of the 3D metal printing structure of the present invention on the thermal protective layer 250 illustrated in FIG. 5C by arrow. In the second embodiment, the plurality of deposited lines 210 are sequentially formed from both ends to the central portion of the optical fiber sensor 100. That is, as explicitly illustrated in FIG. 6, when the deposited lines 210 forming the thermal protective layer 250 is referred to as a $\widehat{n}$-th deposited line in order, and a total number of deposited lines 210 is m, the thermal protective layer forming step includes a step of forming a ①-th deposited line at one end of the optical fiber sensor 100, a step of forming a ②-th deposited line at the other end of the optical fiber sensor 100, a step of forming a ③-th deposited line closely to the other side of the ①-th deposited line or at a predetermined interval, a step of forming a ④-th deposited line closely to one side of the ②-th deposited line or at a predetermined interval, and a step of forming a ⓜ-th deposited line at a central portion of the optical fiber sensor 100. Here, " . . . " is a part that omits the description of the next step that proceeds continuously. In the example of FIG. 6, since the total number of the deposited lines 210 is nine, up to the ⑨-th deposited line is displayed.

In the case of applying the embedding direction as in the second embodiment, since it is a slightly different form from the general 3D metal printing operation, there may be a slight decrease in user convenience in that the operation algorithm that is separately applied in the optical fiber sensor embedding process should be newly generated. However, according to the second embodiment, since both ends of the optical fiber sensor 100 are fixed first and then other operations are performed, the above-described problem of dislocation of the ends due to the thermal deformation may be fundamentally eliminated. That is, according to the second embodiment, there is a great advantage in that the optical fiber sensor 100 may be embedded in a precisely desired position without stretching or twisting the optical fiber sensor 100.

Figure 7:
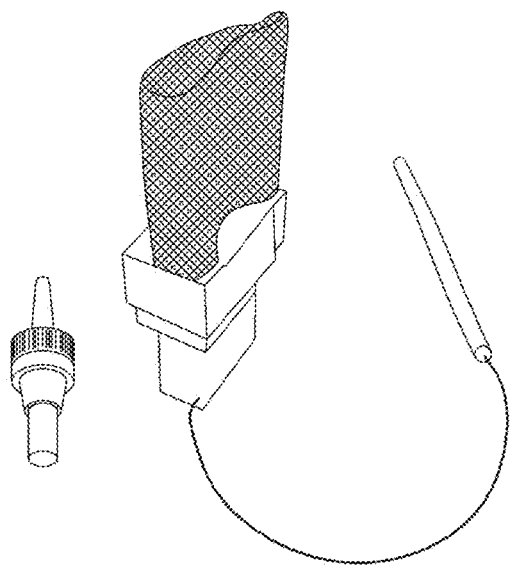
FIG. 7 is a diagram illustrating an optical fiber sensor embedded 3D metal printing turbine blade manufactured by the optical fiber sensor embedding method of the present invention and actual measurement results.
Figure 7:
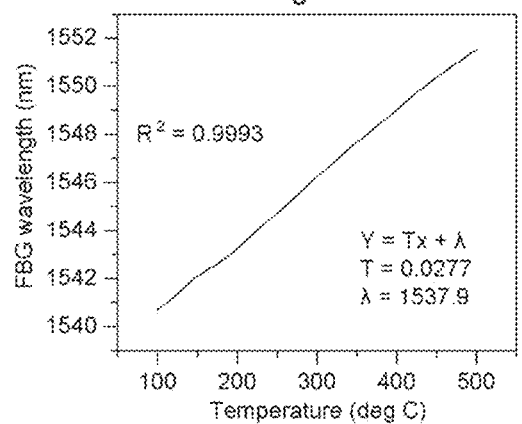
Figure 7:
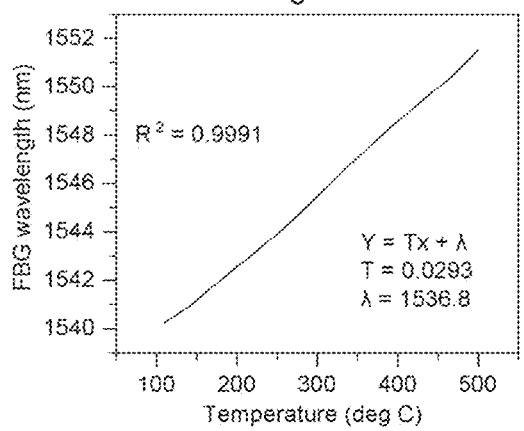

FIG. 7 is a diagram illustrating an optical fiber sensor embedded 3D metal printing turbine blade manufactured by the optical fiber sensor embedding method of the present invention and actual measurement results. The photograph of the upper drawing in FIG. 7 is actually a miniature of the optical fiber sensor embedded 3D metal printing turbine blade manufactured by the above-described method. Even in the photograph, it can be seen that the optical fiber sensor is well embedded in the turbine blade and the optical fiber sensor line is long downward. The results measured by the optical fiber sensor while performing the actual heating or cooling process using this line are illustrated in two graphs (heating mode/cooling mode) in the lower figure. From the fact that the FBG wavelength in the optical fiber sensor changes linearly as the temperature changes, it is clearly confirmed that the embedded optical fiber sensor changes well according to the thermal deformation of the turbine blade itself and operates normally without damage.

The present invention is not limited to the abovementioned exemplary embodiments, but may be variously applied. In addition, the present invention may be variously modified by those skilled in the art to which the present invention pertains without departing from the gist of the present invention claimed in the claims.

INDUSTRIAL APPLICABILITY

According to the present invention, it is possible to embed an optical fiber sensor for sensing temperature, stress, etc., without any damage in a high-temperature harsh environment close to a melting point of metal when manufacturing a 3D metal printing structure. Therefore, it is possible to embed an optical fiber sensor while manufacturing a turbine blade, which is a complex and precise product, using 3D metal printing. Since the optical fiber sensor is completely embedded in the turbine blade, it is possible to more accurately measure various physical quantities such as temperature and stress during operation and obtain much better structural health monitoring results.

The invention claimed is:

1. An optical fiber sensor embedding method for a 3D metal printing structure, comprising:
    an optical fiber sensor arranging step in which the optical fiber sensor is arranged at a predetermined location during manufacturing of a structure while the structure is manufactured by 3D metal printing; and
    a thermal protective layer forming step in which a thermal protective layer is manufactured as a layer sequentially formed according to a predetermined order in a form in which a plurality of deposited lines made of molten metal cover the optical fiber sensor and a predetermined dwell time is given between formation operations of each of the deposited lines,
    wherein, in the thermal protective layer forming step, the plurality of deposited lines are sequentially formed from both ends to central portion of the optical fiber sensor, and
    wherein the thermal protective layer forming step includes:
    when the deposited lines forming the thermal protective layer is referred to as a ⓝ-th thermal protective layer deposited line in order, and a total number of deposited lines (210) is m,
    a step of forming a ①-th deposited line at one end of the optical fiber sensor;
    a step of forming a ②-th deposited line at the other end of the optical fiber sensor;
    a step of forming a ③-th deposited line next to the other side of the ①-th deposited line or at a predetermined interval;
    a step of forming a ④-th deposited line next to one side of the ②-th deposited line or at a predetermined interval, continuing in the same way; and
    a step of forming a ⓜ-th deposited line at a central portion of the optical fiber sensor.

2. The optical fiber sensor embedding method of claim 1, wherein the dwell time is formed within a range in which heat dissipation of the deposited line occurs to a level that prevents the optical fiber sensor from being damaged by thermal shock generated from the molten metal.

3. The optical fiber sensor embedding method of claim 2, wherein, during the formation of the deposited line, the deposited line is formed in a form in which a dilution layer having the molten metal less hardened and a deposited layer formed on an outside of the dilution layer to dissipate heat to outside air and having the molten metal completely hardened are stacked, and
    the dwell time is determined within a range of time required for the dilution layer of one deposited line to be converted into the deposited layer by 50% to 100%.

4. The optical fiber sensor embedding method of claim 1, further comprising:
    prior to the optical fiber sensor arranging step, a pre-embedding step in which a product before embedding having a shape of the structure before the optical fiber sensor is embedded is manufactured by repeating a 3D printing step in which layers formed by arranging the plurality of deposited lines in a predetermined shape are stacked; and
    after the thermal protective layer forming step, a post-embedding step in which a product after embedding having the shape of the remaining structure (200) after the product before embedding is manufactured by repeating the 3D printing step after the optical fiber sensor is embedded.

5. The optical fiber sensor embedding method of claim 4, wherein, in the pre-embedding step, an accommodation groove in which the optical fiber sensor is accommodated is formed at a location where the optical fiber sensor is arranged.

6. The optical fiber sensor embedding method of claim 1, wherein the optical fiber sensor embedding method for a 3D metal printing structure is performed by a direct metal deposition (DED) method in which, when the deposited line is formed,
- a step of injecting a metal powder injecting body toward a predetermined target location with a metal powder nozzle unit of a printing head,
- a step of forming a molten part by melting the metal powder injecting body by a laser beam irradiated from the printing head to the target location, and
- a step of forming the deposited line by moving the printing head to another location along a predetermined trajectory and hardening the molten part by heat dissipation from the outside over time are repeated.

7. An optical fiber sensor embedded 3D metal printing turbine blade, wherein the optical fiber sensor embedded 3D metal printing turbine blade is manufactured by the 3D metal printing method including the optical fiber sensor embedding method for a 3D metal printing structure according to claim 1, and
- at least one optical fiber sensor is embedded in a predetermined location inside.

8. The optical fiber sensor embedded 3D metal printing turbine blade of claim 7, wherein the optical fiber sensor includes an optical fiber in which a Bragg grating is formed.

9. The optical fiber sensor embedded 3D metal printing turbine blade of claim 8, wherein the optical fiber sensor includes a metal jacket surrounding the optical fiber.

10. The optical fiber sensor embedded 3D metal printing turbine blade of claim 9, wherein the metal jacket is made of the same metal as metal constituting the structure.

* * * * *